United States Patent
Hoo et al.

(10) Patent No.: US 12,377,794 B2
(45) Date of Patent: Aug. 5, 2025

(54) SELF-CENTERING CAMERA MOUNT FOR BENCHMARKING LANE CENTERING ASSIST SYSTEM

(71) Applicant: SUBARU CORPORATION, Tokyo (JP)

(72) Inventors: John Hoo, VanBuren Township, MI (US); Evan Millison, VanBuren Township, MI (US); Yueh-Lin Tsai, VanBuren Township, MI (US); Henry Beckstein, VanBuren Township, MI (US); Leo Lavigne, VanBuren Township, MI (US); Rohan Sequeira, VanBuren Township, MI (US); Joseph Zeolla, VanBuren Township, MI (US)

(73) Assignee: SUBARU CORPORATION, Tokyo (JP)

( * ) Notice: Subject to any disclaimer, the term of this patent is extended or adjusted under 35 U.S.C. 154(b) by 188 days.

(21) Appl. No.: 18/460,194

(22) Filed: Sep. 1, 2023

(65) Prior Publication Data

US 2025/0074330 A1    Mar. 6, 2025

(51) Int. Cl.
*B60R 11/04* (2006.01)
*G03B 17/56* (2021.01)
*G06V 20/56* (2022.01)

(52) U.S. Cl.
CPC ............ *B60R 11/04* (2013.01); *G03B 17/561* (2013.01); *G06V 20/56* (2022.01)

(58) Field of Classification Search
None
See application file for complete search history.

(56) References Cited

U.S. PATENT DOCUMENTS 10,099,630 B1 * 10/2018 Krishnan .............. G01S 7/4813
2022/0250563 A1 * 8/2022 Kobayashi .......... B60R 11/0264

\* cited by examiner

Primary Examiner — Rebecca A Volentine
(74) Attorney, Agent, or Firm — Rimon P.C.

(57) ABSTRACT

Aspects of the subject technology relate to a self-centering camera mount. The self-centering camera mount includes a camera mounting plate, first and second deflectors respectively arranged on a first side and a second side of the vehicle, first and second distance sensors mounted on the camera mounting plate to respectively a first distance between the first distance sensor and the first deflector and a second distance between the second distance sensor and the second deflector, and a processor that, when determining that the first distance and the second distance do not match each other, controls, based on the received first and second distances, a camera mounting plate actuator to slide the camera mounting plate until the first and second distances become equal to each other.

14 Claims, 5 Drawing Sheets

SELF-CENTERING CAMERA MOUNT FOR BENCHMARKING LANE CENTERING ASSIST SYSTEM

BACKGROUND

Aspects of the subject technology relate to a self-adjusting camera mount, and in particular, to a self-centering camera mount for assessing the specifications of lane centering assist (LCA) systems of vehicles.

SUMMARY

A self-centering camera mount system may include a first guide rail, a second guide rail, and a camera mounting plate slidably arranged on the first and second guide rails. The camera mounting plate has one or more cameras mounted thereon to capture images of the vehicle's surrounding environment. The self-centering camera mount system may further include first and second deflectors respectively arranged on a first side and a second side of the vehicle, and first and second distance sensors mounted on the camera mounting plate to respectively face the first and second deflectors. The first distance sensor measures a first distance between the first distance sensor and the first deflector. The second distance sensor measures a second distance between the second distance sensor and the second deflector. The self-centering camera mount system may also include a processor and a memory storing programs that, when executed by the processor, cause the processor to receive, from the first and second distance sensors, the first distance and the second distance, determine that the first distance and the second distance do not match each other, and control, based on the received first and second distances, a camera mounting plate actuator to slide the camera mounting plate along the first and second guide rails until the first and second distances become equal to each other.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description may include specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Vehicles are equipped with advanced driver assistance systems (ADAS). The ADAS includes a LCA system for assisting the driver of a vehicle with steering by maintaining the position of the vehicle in the center of the traveling lane. The LCA system provides automatic steering to continually center the vehicle in its traveling lane.

The purpose of the LCA system may be the same across different vehicles, but the design specifications of the LCA system may differ across different vehicles and/or different vehicle manufacturers. When developing a new LCA system, the LCA system designers refer to the LCA designs of competitive vehicles and/or vehicle manufacturers (competitors) to design a LCA system that is superior than that of the competitors. However, the design specifications of the LCA system for each of the competitors are not readily available. Thus, in order to gather data of the LCA systems of the competitors, the LCA system designer may perform his/her own assessment on the LCA systems of the competitors to gather data (the LCA functional designs and the precisions) necessary to design a new LCA system.

Assessing the LCA systems requires mounting a camera on a competitive vehicle and calibrating the position of the camera with respect to the vehicle. Conventionally, setting up the equipment requires a several hours (e.g., approximately four hours) often requiring the assistance of a second person. To address the technical problems, the subject technology provides technical solutions of providing a self-centering camera mount system to reduce the time cost for setting up and calibrating a camera mount system on a vehicle to assess the LCA system of the vehicle.

Figure 1A:
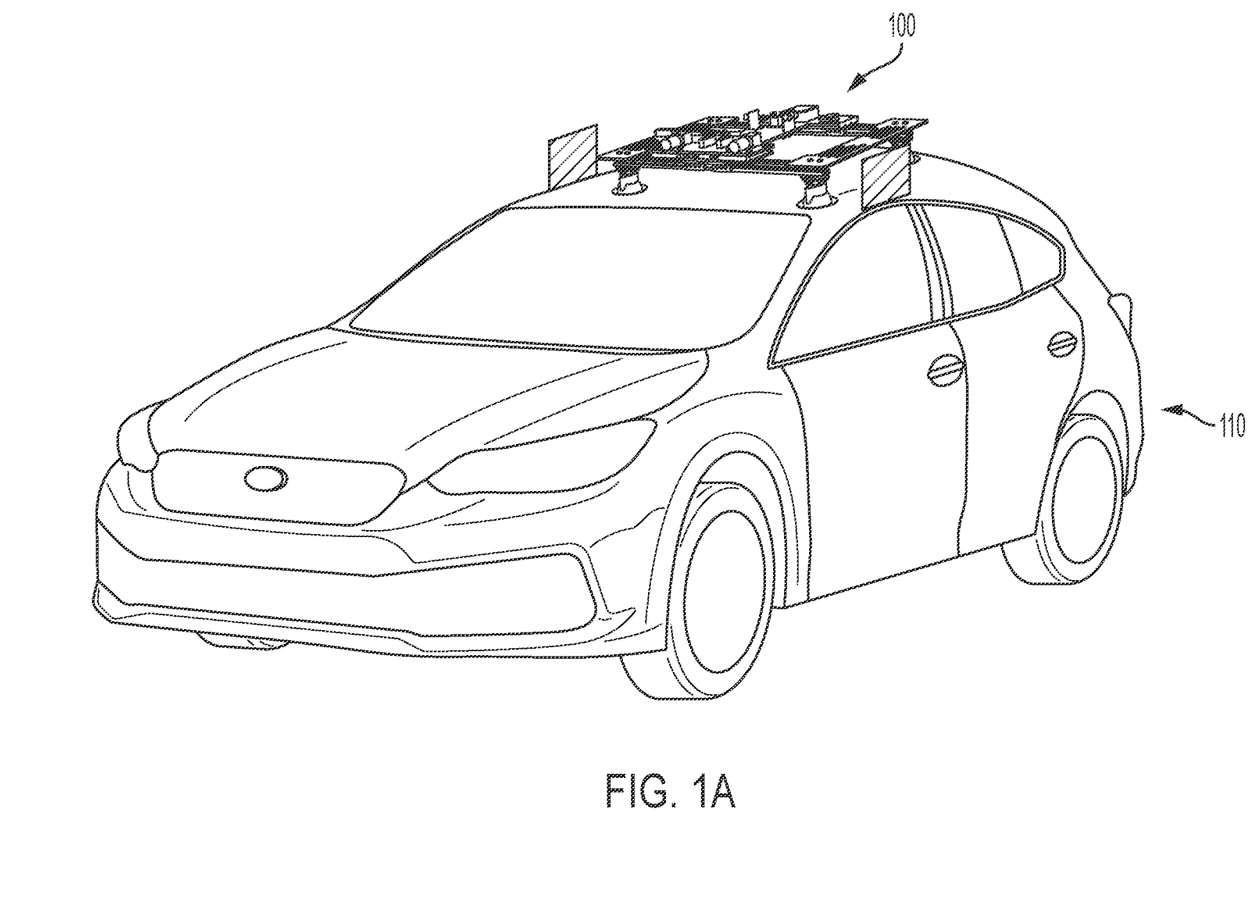
FIG. 1A illustrates an example camera mount system for dynamically adjusting a position of a stereo camera on a camera mount in accordance with the subject technology.

FIG. 1A illustrates an example camera mount system 100 for dynamically adjusting a position of a stereo camera on a camera mount in accordance with the subject technology. The camera mount system 100 is mounted on a vehicle 110. The camera mount system 100 may be mounted on a roof of the vehicle 110 as illustrated in FIG. 1A. In some embodiments, the camera mount system 100 may be mounted on other portions of the vehicle 110 as long as the camera on the camera mount system 100 is set up to capture a surrounding environment of the vehicle 110. For example, the camera mount system 100 may be mounted such that the camera captures a forward environment of the vehicle 110. In yet another example, the camera mount system 100 may be mounted such that the camera captures a rearward environment of the vehicle 110.

Figure 1B:
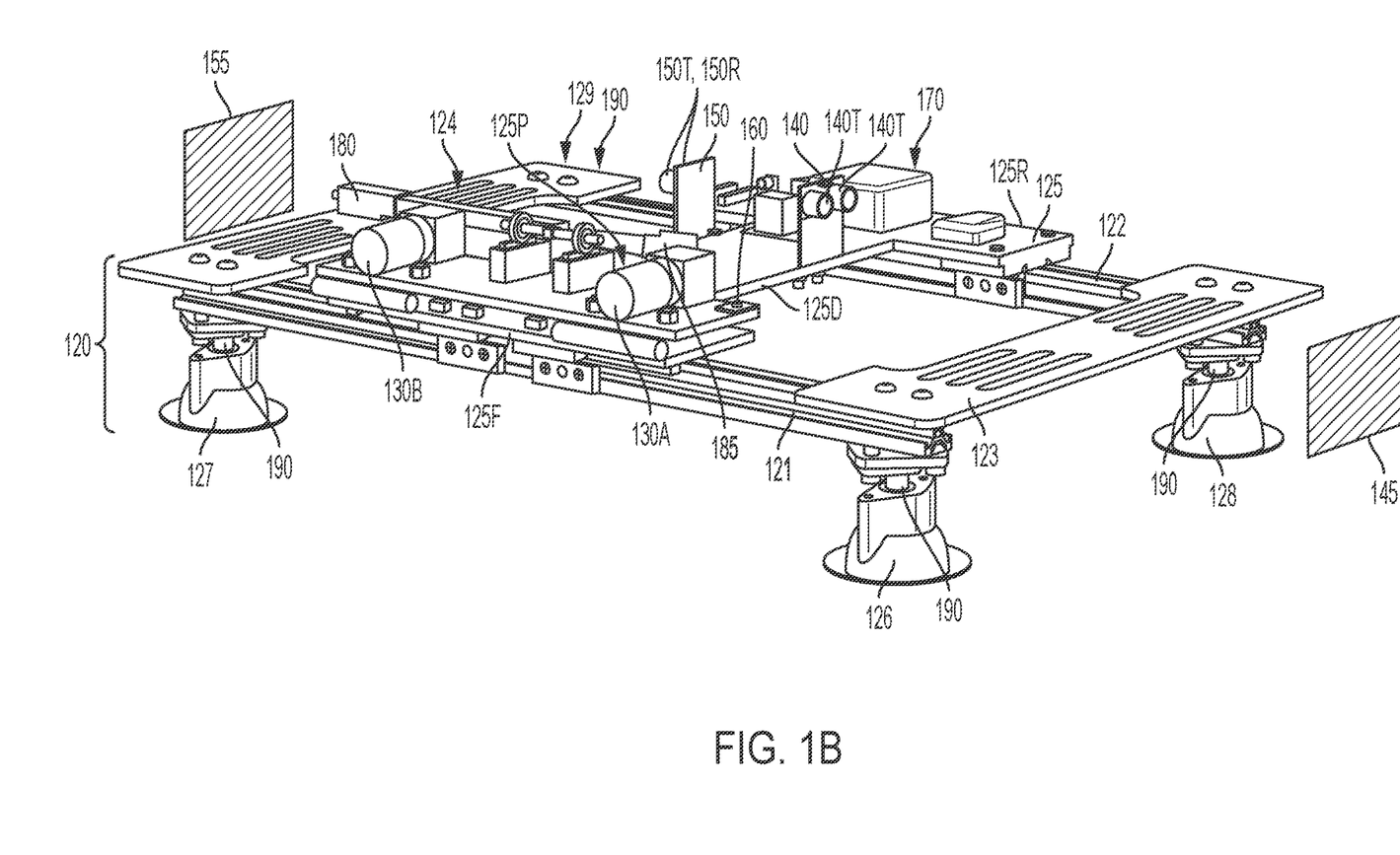
FIG. 1B illustrates an enlarged view of the camera mount system illustrated in FIG. 1A.

FIG. 1B illustrates an enlarged view of the camera mount system 100 illustrated in FIG. 1A. The camera mount system 100 includes a camera mount 120, a camera 130, a first distance sensor 140, a first deflector 145, a second distance sensor 150, a second deflector 155, a tilt sensor 160, and a controller 170. The camera mount 120 includes a first guide rail 121, a second guide rail 122, a first bridging plate 123, a second bridging plate 124, and a camera mounting plate 125.

The first guide rail 121 includes a first leg 126 and a second leg 127. The first leg 126 is disposed at a first end of the first guide rail 121 and the second leg 127 is disposed at a second end of the first guide rail 121 to support the first guide rail 121. The second guide rail 122 includes a third leg 128 and a fourth leg 129. The third leg 128 is disposed at a first end of the second guide rail 122 and the fourth leg 129 is disposed at a second end of the second guide rail 122 to support the second guide rail 122. The first guide rail 121 and the second guide rail 122 are arranged to be parallel to each other, and are spaced at a constant distance apart from each other.

The first bridging plate 123 and the second bridging plate 124 each extends between the first guide rail 121 and the second guide rail 122. For example, the first bridging plate 123 and the second bridging plate 124 extend from the first guide rail 121 to the second guide rail 122 to maintain a constant distance between the first guide rail 121 and the second guide rail 122 such that the first guide rail 121 and the second guide rail 122 are maintained to be parallel to be each other. In some aspects, the camera mount 120 can have more or fewer bridging plates (e.g., 123 and 124) than those shown in FIG. 1B.

The camera mounting plate 125 extends between the first guide rail 121 and the second guide rail 122, and is moveable in a longitudinal direction along the first guide rail 121 and the second guide rail 122. For example, a moving direction of the camera mounting plate 125 parallels a longitudinal axis of the first guide rail 121 and the second guide rail 122. The camera mounting plate 125 includes a front edge 125F, a rear edge 125R that is opposite the front edge 125F, a driver side edge 125D that extends between the front edge 125F and the rear edge 125R, and a passenger side edge 125P that is opposite the driver side edge 125D.

When the camera mount system 100 is mounted on the vehicle 110, the front edge 125F and the rear edge 125R intersect a traveling direction of the vehicle 110. For example, the camera mount system 100 is mounted on the vehicle 110 such that the front edge 125F and the rear edge 125R perpendicularly intersect the traveling direction of the vehicle 110 while the driver side edge 125D and the passenger side edge 125P parallel the traveling direction of the vehicle 110.

Further, when the camera mount system 100 is mounted on the vehicle 110, the front edge 125F is located closer to the front of the vehicle 110 than the rear edge 125R, the rear edge 125R is located closer to the rear of the vehicle 110 than the front edge 125F, the driver side edge 125D is located closer to a driver side of the vehicle 110 than the passenger side edge 125P, and the passenger side edge 125P is located closer to a passenger side of the vehicle 110. The camera mounting plate 125 may have the camera 130, the first distance sensor 140, the second distance sensor 150, the tilt sensor 160, and the controller 170 mounted thereon.

The camera 130 is disposed on the camera mounting plate 125 to capture images of the surrounding environment of the vehicle 110. For example, the camera 130 is disposed at the front edge 125F of the camera mounting plate 125 and at a midpoint between the driver side edge 125D and the passenger side edge 125P of the camera mounting plate 125. In some embodiments, the camera 130 is disposed at the rear edge 125R of the camera mounting plate 125 and at the midpoint between the driver side edge 125D and the passenger side edge 125P of the camera mounting plate 125.

The camera 130 may include a stereo camera that captures images using at least two image sensors 130A and 130B. The two image sensors 130A and 130B are spaced apart from each other in a width direction of the vehicle 110 such that one (e.g., 130A) of the two image sensors is disposed on the camera mounting plate 125 to be closer to the driver side of the vehicle 110 than another (e.g., 130B) of the two image sensors. When the camera 130 is disposed at the front edge 125F, the two image sensors 130A and 130B both may be disposed at the front edge 125F of the camera mounting plate 125 such that a midpoint between the two image sensors 130A and 130B matches the midpoint between the driver side edge 125D and the passenger side edge 125P of the camera mounting plate 125. In some embodiments, when the camera 130 is disposed at the rear edge 125R, the two image sensors 130A and 130B both may be disposed at the rear edge 125R of the camera mounting plate 125 such that the midpoint between the two image sensors 130A and 130B matches the midpoint between the driver side edge 125D and the passenger side edge 125P of the camera mounting plate 125.

The first and second distance sensors 140 and 150 respectively measure the distances to the first and second deflectors 145 and 155. For example, the first distance sensor 140 may include a transmitter 140T for transmitting a signal towards the first deflector 145 and a receiver 140R for receiving the reflected signal from the first deflector 145, and measure the distance between the first distance sensor 140 and the first deflector 145. The second distance sensor 150 may include a transmitter 150T for transmitting a signal towards the second deflector 155 and a receiver 150R for receiving the reflected signal from the second deflector 155, and measure the distance between the second distance sensor 150 and the second deflector 155.

The first and second distance sensors 140 and 150 are respectively disposed on the driver side edge 125D and the passenger side edge 125P of the camera mounting plate 125 to face away from each other. For example, the first distance sensor 140 that is disposed on the driver side edge 125D faces toward the driver side of the vehicle 110 while the second distance sensor 150 that is disposed on the passenger side edge 125P faces toward the passenger side of the vehicle 110.

The first and second deflectors 145 and 155 are respectively disposed at a driver side edge and a passenger side edge of the roof of the vehicle 110. For example, the first deflector 145 extends vertically upwards from the driver side edge of the roof of the vehicle 110 and the second deflector 155 extends vertically upwards from the passenger side edge of the roof of the vehicle 110 so that the first deflector 145 and the second deflector 155 are parallel to each other.

The tilt sensor 160 is disposed on the camera mounting plate 125 to detect a tilted state and a non-tilted state of the camera mounting plate 125. For example, the tilt sensor 160 may be disposed on an upper surface of the camera mounting plate 125, and the tilt sensor 160 may measure a tilt angle of the upper surface of the camera mounting plate 125 with respect to a direction of a force of gravity. In some embodiments, the tilt sensor 160 identifies a tilt direction and measures the tilt angle in the identified tilt direction.

The controller 170 represents various forms of processing devices that have a processor, a memory, and communications capability. The controller 170 may communicate with and control the first distance sensor 140, the second distance sensor 150, and the tilt sensor 160. The controller 170 may further communicate with and control a camera mounting plate actuator 180, and leg actuators 190 based on the signals received from the first distance sensor 140 and the second distance sensor 150.

The camera mounting plate actuator 180 moves the camera mounting plate 125 along the longitudinal axis of the first and second guide rails 121 and 122 when the camera mounting plate actuator 180 is controlled by the controller 170. For example, the camera mounting plate actuator 180 extends from one of the first and second bridging plates 123 and 124 to the camera mounting plate 125. In some aspects, the number of the camera mounting plate actuator 180 may be more or fewer than those shown in FIG. 1B.

For example, the controller 170 controls the first distance sensor 140 and the second distance sensor 150 to respectively measure a first distance between the first distance sensor 140 and the first deflector 145 and a second distance between the second distance sensor 150 and the second deflector 155. In response to the first distance sensor 140 and the second distance sensor 150 returning the first distance and the second distance to the controller 170, the controller 170 compares the first distance and the second distance to each other. Upon determining that the first distance and the second distance differ from each other, the controller 170 controls the camera mounting plate actuator 180 to move the camera mounting plate 125 along the longitudinal axis of the first and second guide rails 121 and 122 until the first distance and the second distance become equal to each other.

The leg actuators 190 are provided to the first leg 126, the second leg 127, the third leg 128, and the fourth leg 129, respectively. The leg actuators 190 individually adjust the heights of the first leg 126, the second leg 127, the third leg 128, and the fourth leg 129 when the leg actuators 129 are controlled by the controller 170.

For example, the controller 170 controls the tilt sensor 160 to measure the tilt direction and the tilt angle of the camera mounting plate 125. In response to the tilt sensor 160 returning the tilt direction and the tilt angle of the camera mounting plate 125 to the controller 170, the controller 170 compares the tilt angle of the camera mounting plate 125 to a reference angle. Upon determining that the tilt angle of the camera mounting plate 125 does not match the reference angle, the controller 170 identifies one or more of the first leg 126, the second leg 127, the third leg 128, and the fourth leg 129 to be adjusted based on the tilt direction. Upon identifying the one or more of the first leg 126, the second leg 127, the third leg 128, and the fourth leg 129 to be adjusted, the controller 170 controls one or more leg actuators 190 that correspond to the one or more of the first leg 126, the second leg 127, the third leg 128, and the fourth leg 129 to adjust the heights of the one or more of the first leg 126, the second leg 127, the third leg 128, and the fourth leg 129 until the tilt angle becomes equal to the reference angle.

Figure 2:
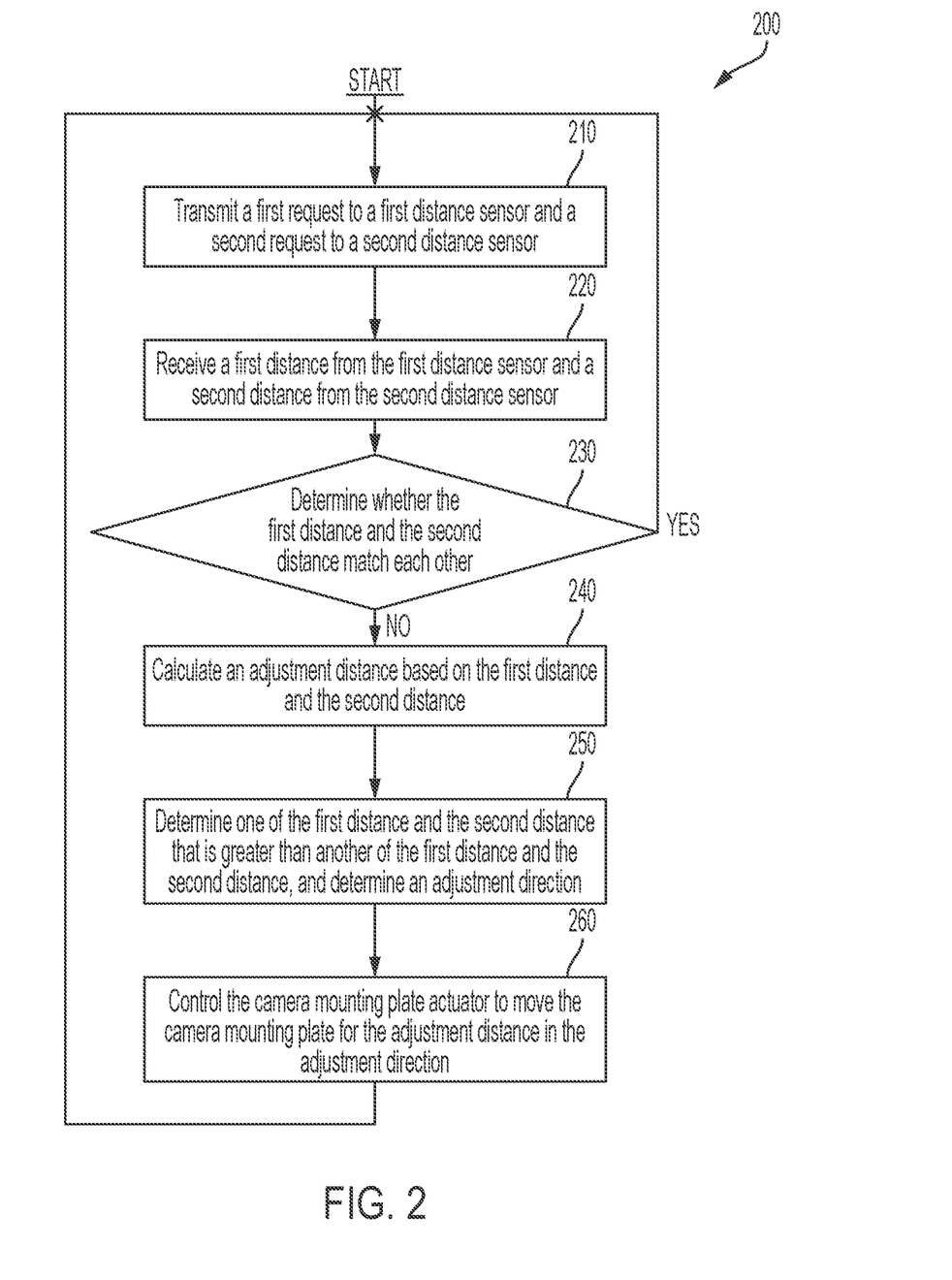
FIG. 2 illustrates a flowchart illustrating example processes for dynamically centering a camera mounting plate in accordance with the subject technology.

FIG. 2 illustrates a flowchart illustrating example processes for dynamically centering the camera mounting plate 125 in accordance with the subject technology. For explanatory purposes, the various blocks of example process 200 are described herein with reference to the components and/or processes described herein. The one or more of the blocks of process 200 may be implemented, for example, by one or more components or processors of controller 170 of FIG. 1B. In some implementations, one or more of the blocks may be implemented apart from other blocks, and by one or more different processors or controllers. Further, for explanatory purposes, the blocks of example process 200 are described as occurring in serial, or linearly. However, multiple blocks of example process 200 may occur in parallel. In addition, the blocks of example process 200 need not be performed in the order shown and/or one or more of the blocks of example process 200 need not be performed.

When the camera mount system 100 is mounted on the vehicle 110, the process 200 starts at block 210. At block 210, the controller 170 transmits a first request to the first distance sensor 140 to measure and return a first distance between the first distance sensor 140 and the first deflector 145 to the controller 170, and transmits a second request to the second distance sensor 150 to measure and return a second distance between the second distance sensor 150 and the second deflector 155 to the controller 170. In some embodiments, instead of the controller 170 transmitting the first and second requests multiple times, the controller 170 may transmit the first and second requests once to the first distance sensor 140 and the second distance sensor 150 to periodically (e.g., every three seconds, every five seconds, every ten seconds, etc.) measure and transmit the first distance and the second distance to the controller 170.

At block 220, the controller 170 receives the first distance from the first distance sensor 140 and the second distance from the second distance sensor 150 in response to the first and second requests transmitted at block 210.

At block 230, the controller 170 determines whether the first distance and the second distance match each other. When the controller 170 determines that the first distance (e.g., 90 cm) and the second distance (e.g., 90 cm) match each other (block 230=YES), the process 200 returns to block 210. In some embodiments in which the first distance sensor 140 and the second distance sensor 150 are set to periodically measure and transmit the first and second distances to the controller 170, the process 200 may return to block 220. When the controller 170 determines that the first distance (e.g., 80 cm) and the second distance (e.g., 100 cm) do not match each other (block 230=NO), the process proceeds to block 240.

At block 240, the controller 170 calculates an adjustment distance based on the first distance and the second distance. For example, when the first distance is 80 cm and the second distance is 100 cm, the controller 170 calculates the adjustment distance (e.g., 10 cm) by determining a difference (e.g., 20 cm) between the first distance (e.g., 80 cm) and the second distance (e.g., 100 cm) and dividing the difference (e.g., 20 cm) by two.

At block 250, the controller 170 determines one of the first distance and the second distance that is greater than another of the first distance and the second distance, and determines an adjustment direction by determining one of the first distance sensor 140 and the second distance sensor 150 that transmitted the one of the first distance and the second distance that is larger than another of the first distance and the second distance. For example, when the first distance is 80 cm and the second distance is 100 cm, the controller 170 determines the second distance to be greater than one of the first and second distances, determines the second distance sensor 150 for transmitting the second distance, and determines a movement direction toward the passenger side of the vehicle 110 as the adjustment direction. Yet in another example, when the first distance (e.g., 95 cm) is determined to be greater than the second distance (e.g., 85 cm), the controller 170 determines a movement direction toward the driver side of the vehicle 110 as the adjustment direction.

At block 260, the controller 170 controls the camera mounting plate actuator 180 to move the camera mounting plate 125 for the adjustment distance in the adjustment direction. For example, when the first distance is 80 cm and the second distance is 100 cm, the controller 170 controls the camera mounting plate actuator 180 to move the camera mounting plate 125 for 10 cm towards the passenger side of the vehicle 110. After block 260, the process 200 returns to block 210. In some embodiments in which the first distance sensor 140 and the second distance sensor 150 are set to periodically measure and transmit the first and second distances to the controller 170, the process 200 may return to block 220. The process 200 then may repeat the blocks 210-260.

Figure 3:
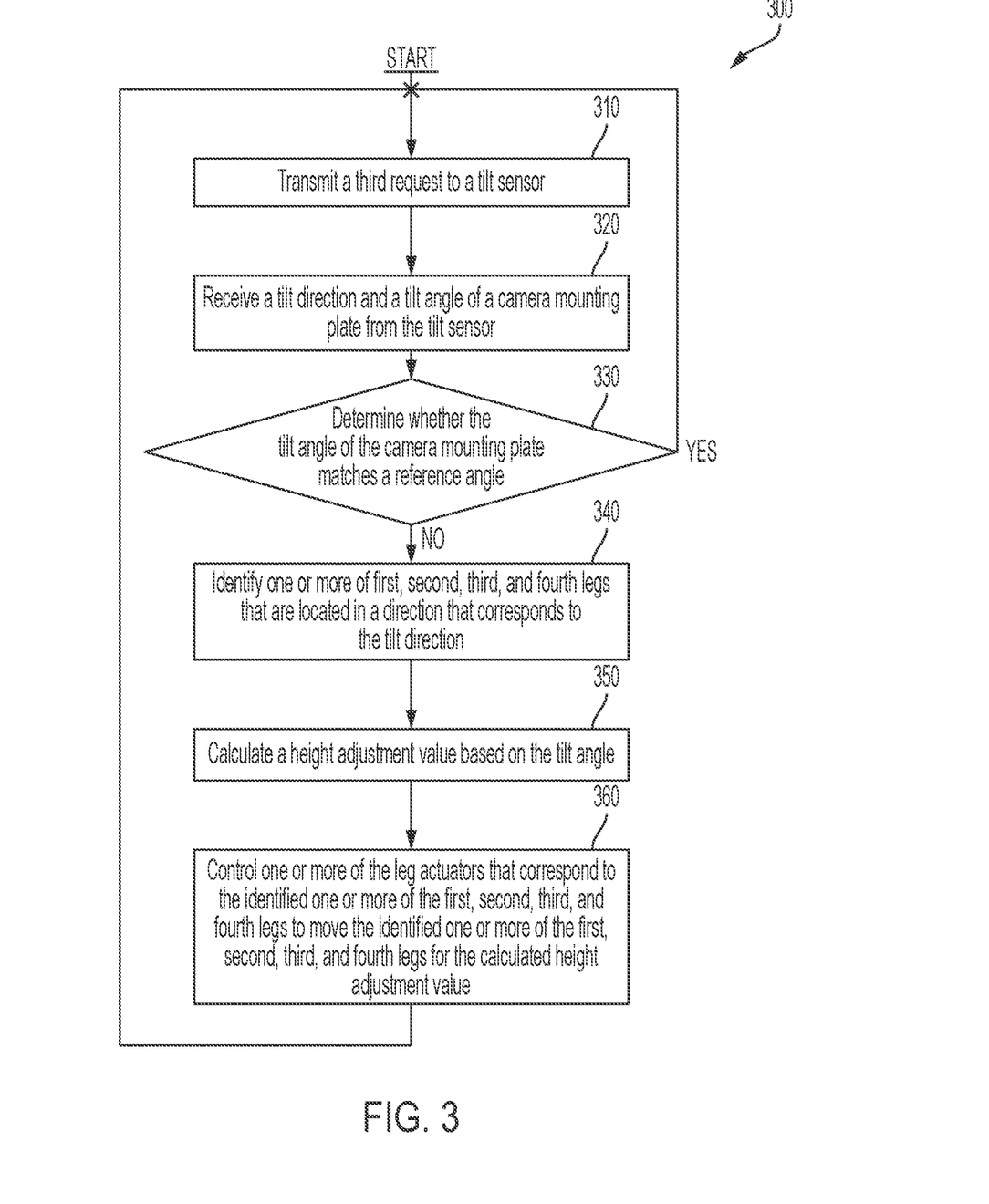
FIG. 3 illustrates a flowchart illustrating example processes for dynamically leveling a camera mounting plate in accordance with the subject technology.

FIG. 3 illustrates a flowchart illustrating example processes for dynamically leveling the camera mounting plate 125 in accordance with the subject technology. For explanatory purposes, the various blocks of example process 300 are described herein with reference to the components and/or processes described herein. The one or more of the blocks of process 300 may be implemented, for example, by one or more components or processors of controller 170 of FIG. 1B. In some implementations, one or more of the blocks may be implemented apart from other blocks, and by one or more different processors or controllers. Further, for explanatory purposes, the blocks of example process 300 are described as occurring in serial, or linearly. However, multiple blocks of example process 300 may occur in parallel. In addition, the blocks of example process 300 need not be performed in the order shown and/or one or more of the blocks of example process 300 need not be performed.

When the camera mount system 100 is mounted on the vehicle 110, the process 300 starts at block 310. At block 310, the controller 170 transmits a third request to the tilt sensor 160 to measure and return a tilt direction and a tilt angle of the camera mounting plate 125 to the controller 170. The tilt sensor 160 may a multi-axis tilt sensor that measures a degree of departure from the gravity vector. In some embodiments, instead of the controller 170 transmitting the third request multiple times, the controller 170 may transmit the third request once to the tilt sensor 160 to periodically (e.g., every ten seconds, etc.) measure and transmit the tilt direction and the tilt angle of the camera mounting plate 125 to the controller 170.

At block 320, the controller 170 receives the tilt direction and the tilt angle of the camera mounting plate 125 in response to the third request transmitted at block 310.

At block 330, the controller 170 determines whether the tilt angle of the camera mounting plate 125 matches a reference angle. When the controller 170 determines that the tilt angle matches the reference angle (block 330=YES), the process 300 returns to block 310. In some embodiments in which the tilt sensor 160 is set to periodically measure and transmit the tilt direction and the tilt angle to the controller 170, the process 300 may return to block 320. When the controller 170 determines that the tilt angle does not match the reference angle (block 330=NO), the process proceeds to block 340.

At block 340, the controller 170 identifies one or more of the first leg 126, the second leg 127, the third leg 128, and the fourth leg 129 that are located in a direction that corresponds to the tilt direction. At block 350, the controller 170 calculates a height adjustment value based on the tilt angle. At block 360, the controller 170 controls one or more of the leg actuators 190 that correspond to the identified one or more of the first leg 126, the second leg 127, the third leg 128, and the fourth leg 129 to move the identified one or more of the first leg 126, the second leg 127, the third leg 128, and the fourth leg 129 for the calculated height adjustment value. After block 360, the process 300 returns to block 310. In some embodiments in which the tilt sensor 160 is set to periodically measure and transmit the tilt direction and the tilt angle to the controller 170, the process 300 may return to block 320. The process 300 then may repeat the blocks 310-360.

Figure 4:
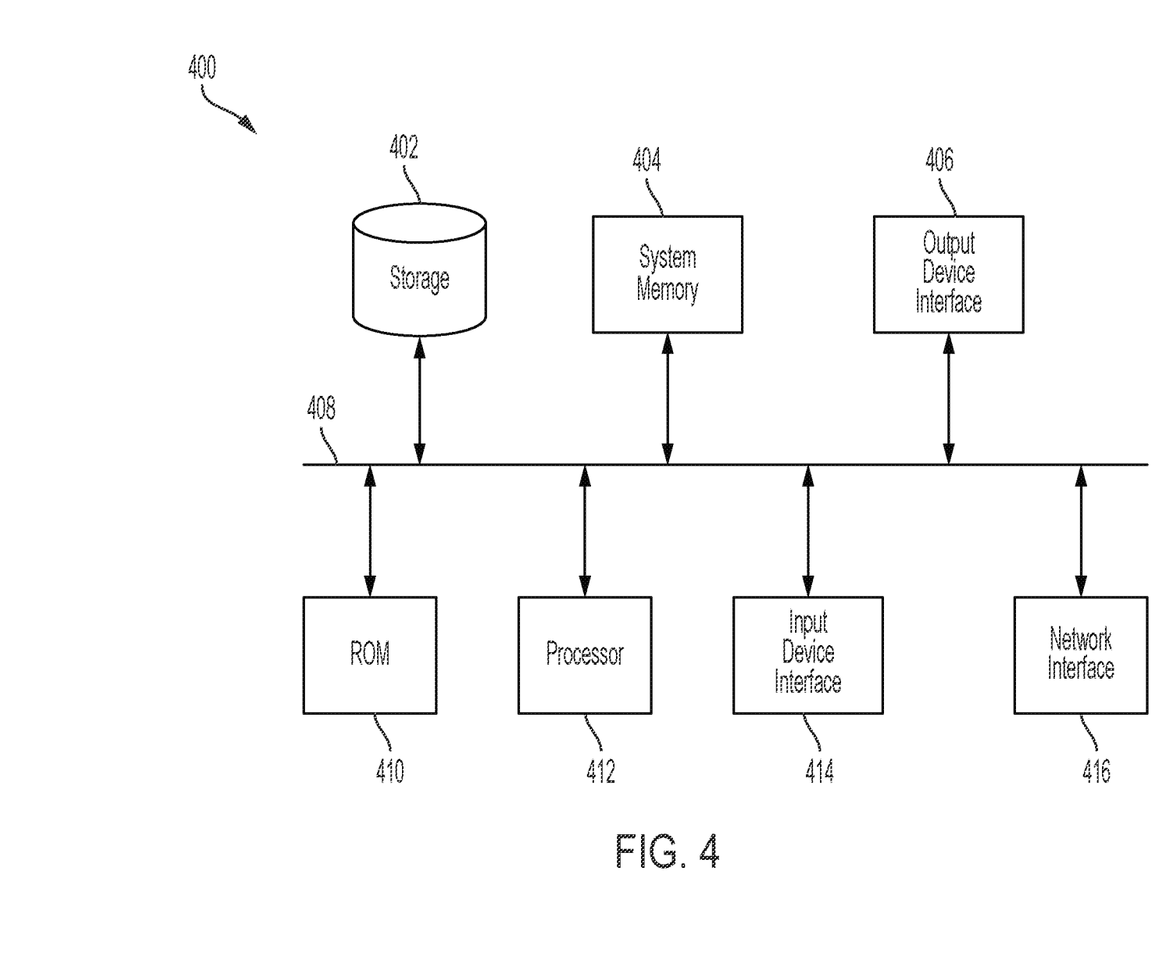
FIG. 4 conceptually illustrates an example electronic system with which some implementations of the subject technology can be implemented.

FIG. 4 is a block diagram illustrating an exemplary electronic system 400 with which controller 170 of FIG. 1B can be implemented to control the vehicle. In certain aspects, the electronic system 400 may be implemented using hardware or a combination of software and hardware, either in a dedicated electronic control unit (ECU), or integrated into another entity, or distributed across multiple entities. The electronic system 400 (e.g., controller 170) includes a bus 408, a processor 412, a system memory 404, a read-only memory (ROM) 410, a permanent storage device 402, an input device interface 414, an output device interface 406, and a network interface 416.

The bus 408 collectively represents all system, peripheral, and chipset buses that communicatively connect the numerous internal devices of the electronic system 400. For instance, the bus 408 communicatively connects the processor 412 with the ROM 410, the system memory 404, and the permanent storage device 402.

From these various memory units, the processor 412 retrieves instructions to execute and data to process in order to execute the processes of the subject disclosure. The processor 412 can be a single processor or a multi-core processor in different implementations.

The ROM 410 stores static data and instructions that are needed by the processor 412 and other modules of the electronic system. The permanent storage device 402, on the other hand, is a read-and-write memory device. This device is a non-volatile memory unit that stores instructions and data even when the electronic system 400 is off. Some implementations of the subject disclosure use a mass-storage device (for example, a magnetic or optical disk, or flash memory) as the permanent storage device 402.

Other implementations use a removable storage device (for example, a flash drive) as the permanent storage device 402. Like the permanent storage device 402, the system memory 404 is a read-and-write memory device. However, unlike the storage device 402, the system memory 404 is a volatile read-and-write memory, such as a random access memory. The system memory 404 stores some of the instructions and data that the processor needs at runtime. In some implementations, the processes of the subject disclosure are stored in the system memory 404, the permanent storage device 402, or the ROM 410. For example, the various memory units include instructions for displaying graphical elements and identifiers associated with respective applications, receiving a predetermined user input to display visual representations of shortcuts associated with respective applications, and displaying the visual representations of shortcuts. From these various memory units, the processor 412 retrieves instructions to execute and data to process in order to execute the processes of some implementations.

The bus 408 also connects to the input and output device interfaces 414 and 406. The input device interface 414 enables the user to communicate information and select commands to the electronic system. Input devices used with the input device interface 414 include, for example, alphanumeric keyboards and pointing devices (also called "cursor control devices"). The output device interfaces 406 enables, for example, the display of images generated by the electronic system 400. Output devices used with the output device interface 406 include, for example, display devices, for example, cathode ray tubes (CRT) or liquid crystal displays (LCD). Some implementations include devices, for example, a touchscreen that functions as both input and output devices.

Finally, as shown in FIG. 4, the bus 408 also couples the electronic system 400 to a network (not shown) through a network interface 416. In this manner, the computer can be a part of a network of computers (for example, a CAN, a LAN, a WAN, or an Intranet, or a network of networks, for example, the Internet). Any or all components of the electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processors (e.g., one or more processors, cores of processors, or other processing units), they cause the processors to perform the actions indicated in the instructions. Examples of computer readable media include, but are not limited to, magnetic media, optical media, electronic media, etc. The computer readable media does not include carrier waves and electronic signals passing wirelessly or over wired connections.

In this specification, the term "software" is meant to include, for example, firmware residing in read-only memory or other form of electronic storage, or applications that may be stored in magnetic storage, optical, solid state, etc., which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Such electronic components are implemented by circuitry including, for example, one or more semiconductor integrated circuits. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself. ASICs and FPGAs are also implemented by semiconductor integrated circuits.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It may be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor may they be interpreted in such a way.

What is claimed is:

1. A self-centering camera mount system removably mounted on a vehicle, the self-centering camera mount system comprising:
a first guide rail;
a second guide rail;
a camera mounting plate slidably arranged on the first and second guide rails, wherein the camera mounting plate has one or more cameras mounted thereon to capture images of the vehicle's surrounding environment;
first and second deflectors respectively arranged on a first side and a second side of the vehicle, the first side being opposite the second side;
first and second distance sensors mounted on the camera mounting plate to respectively face the first and second deflectors, wherein the first distance sensor measures a first distance between the first distance sensor and the first deflector, and wherein the second distance sensor measures a second distance between the second distance sensor and the second deflector;
a processor; and
a memory storing programs that, when executed by the processor, cause the processor to:
receive the first distance and the second distance from the first distance sensor and the second distance sensor, respectively;
determine that the first distance and the second distance do not match each other; and
control, in response to determining that the first distance and the second distance do not match each other, a camera mounting plate actuator to slide the camera mounting plate along the first and second guide rails until the first and second distances become equal to each other.

2. The self-centering camera mount system of claim 1, wherein, in response to determining that the first distance and the second distance do not match each other, the processor calculates an adjustment distance by determining a difference between the first distance and the second distance and dividing the difference by two, and wherein the processor controls the camera mounting plate actuator to move the camera mounting plate for the adjustment distance.

3. The self-centering camera mount system of claim 2, wherein, in response to determining that the first distance and the second distance do not match each other, the processor 1) determines one of the first distance and the second distance that is greater than another of the first distance and the second distance, and 2) determines, based on the determined one of the first distance and the second distance that is greater than another of the first distance and the second distance, a movement direction of the camera mounting plate.

4. The self-centering camera mount system of claim 3, wherein, when the processor determines that the first distance received from the first distance sensor is greater than the second distance received from the second distance sensor, the processor controls the camera mounting plate actuator to move the camera mounting plate to move toward the first deflector, and
wherein, when the processor determines that the second distance received from the second distance sensor is greater than the first distance received from the first distance sensor, the processor controls the camera mounting plate actuator to move the camera mounting plate toward the second deflector.

5. The self-centering camera mount system of claim 1, wherein, in response to determining that the first distance and the second distance do not match each other, the processor 1) determines one of the first distance and the second distance that is greater than another of the first distance and the second distance, and 2) determines, based on the determined one of the first distance and the second distance that is greater than another of the first distance and the second distance, a movement direction of the camera mounting plate.

6. The self-centering camera mount system of claim 5, wherein, when the processor determines that the first distance received from the first distance sensor is greater than the second distance received from the second distance sensor, the processor controls the camera mounting plate actuator to move the camera mounting plate to move toward the first deflector, and
wherein, when the processor determines that the second distance received from the second distance sensor is greater than the first distance received from the first distance sensor, the processor controls the camera mounting plate actuator to move the camera mounting plate toward the second deflector.

7. The self-centering camera mount system of claim 1, further comprising a tilt sensor mounted on the camera mounting plate,
wherein the tilt sensor measures a tilt direction and a tilt angle of the camera mounting plate,
wherein the first guide rail includes i) a first leg arranged to a first end of the first guide rail and ii) a second leg arranged to a second end of the first guide rail,
wherein the second guide rail includes i) a third leg arranged to a first end of the second guide rail and ii) a fourth leg arranged to a second end of the second guide rail,
wherein first, second, third, and fourth actuators are respectively provided to the first, second, third, and fourth legs,
wherein the first, second, third, and fourth actuators respectively adjust heights of the first, second, third, and fourth legs, and
wherein the processor 1) receives, from the tilt sensor, the tilt direction and the tilt angle of the camera mounting plate, 2) determines that the tilt angle does not match a reference angle, 3) determines one or more of the first, second, third, and fourth legs that are located in a direction that corresponds to the tilt direction, and 4) controls, based on the received the tilt angle, one or more of the first, second, third, and fourth actuators that correspond to the determined one or more of the first, second, third, and fourth legs to adjust the heights of the determined one or more of the first, second, third, and fourth legs until the tilt angle of the camera mounting plate matches the reference angle.

8. A self-centering camera mount system removably mounted on a vehicle, the self-centering camera mount system comprising:
a first guide rail;
a second guide rail;
a camera mounting plate slidably arranged on the first and second guide rails, wherein the camera mounting plate has one or more cameras mounted thereon to capture images of the vehicle's surrounding environment;
first and second deflectors respectively arranged on a first side and a second side of the vehicle, the first side being opposite the second side;
first and second distance sensors mounted on the camera mounting plate to respectively face the first and second deflectors, wherein the first distance sensor measures a first distance between the first distance sensor and the first deflector, and wherein the second distance sensor measures a second distance between the second distance sensor and the second deflector;
circuitry configured to:
receive the first distance and the second distance from the first distance sensor and the second distance sensor, respectively;
determine that the first distance and the second distance do not match each other; and
control, in response to determining that the first distance and the second distance do not match each other, a camera mounting plate actuator to slide the camera mounting plate along the first and second guide rails until the first and second distances become equal to each other.

9. The self-centering camera mount system of claim 8, wherein, in response to determining that the first distance and the second distance do not match each other, the circuitry calculates an adjustment distance by determining a difference between the first distance and the second distance and dividing the difference by two, and
wherein the circuitry controls the camera mounting plate actuator to move the camera mounting plate for the adjustment distance.

10. The self-centering camera mount system of claim 9, wherein, in response to determining that the first distance and the second distance do not match each other, the circuitry 1) determines one of the first distance and the second distance that is greater than another of the first distance and the second distance, and 2) determines, based on the determined one of the first distance and the second distance that is greater than another of the first distance and the second distance, a movement direction of the camera mounting plate.

11. The self-centering camera mount system of claim 10, wherein, when the circuitry determines that the first distance received from the first distance sensor is greater than the second distance received from the second distance sensor, the circuitry controls the camera mounting plate actuator to move the camera mounting plate to move toward the first deflector, and wherein, when the circuitry determines that the second distance received from the second distance sensor is greater than the first distance received from the first distance sensor, the circuitry controls the camera mounting plate actuator to move the camera mounting plate toward the second deflector.

12. The self-centering camera mount system of claim 8, wherein, in response to determining that the first distance and the second distance do not match each other, the circuitry 1) determines one of the first distance and the second distance that is greater than another of the first distance and the second distance, and 2) determines, based on the determined one of the first distance and the second distance that is greater than another of the first distance and the second distance, a movement direction of the camera mounting plate.

13. The self-centering camera mount system of claim 12, wherein, when the circuitry determines that the first distance received from the first distance sensor is greater than the second distance received from the second distance sensor, the circuitry controls the camera mounting plate actuator to move the camera mounting plate to move toward the first deflector, and wherein, when the circuitry determines that the second distance received from the second distance sensor is greater than the first distance received from the first distance sensor, the circuitry controls the camera mounting plate actuator to move the camera mounting plate toward the second deflector.

14. The self-centering camera mount system of claim 8, further comprising a tilt sensor mounted on the camera mounting plate, wherein the tilt sensor measures a tilt direction and a tilt angle of the camera mounting plate, wherein the first guide rail includes i) a first leg arranged to a first end of the first guide rail and ii) a second leg arranged to a second end of the first guide rail, wherein the second guide rail includes i) a third leg arranged to a first end of the second guide rail and ii) a fourth leg arranged to a second end of the second guide rail, wherein first, second, third, and fourth actuators are respectively provided to the first, second, third, and fourth legs, wherein the first, second, third, and fourth actuators respectively adjust heights of the first, second, third, and fourth legs, and wherein the circuitry 1) receives, from the tilt sensor, the tilt direction and the tilt angle of the camera mounting plate, 2) determines that the tilt angle does not match a reference angle, 3) determines one or more of the first, second, third, and fourth legs that are located in a direction that corresponds to the tilt direction, and 4) controls, based on the received the tilt angle, one or more of the first, second, third, and fourth actuators that correspond to the determined one or more of the first, second, third, and fourth legs to adjust the heights of the determined one or more of the first, second, third, and fourth legs until the tilt angle of the camera mounting plate matches the reference angle.

\* \* \* \* \*